United States Patent [19]

Grunberg

[11] Patent Number: 5,320,028
[45] Date of Patent: Jun. 14, 1994

[54] COOKING UTENSIL

[76] Inventor: Daniel Grunberg, 152 New Mark Esplanade, Rockville, Md. 20850

[21] Appl. No.: 130,372

[22] Filed: Oct. 1, 1993

[51] Int. Cl.$^5$ .......................... A47J 27/00; A47J 27/04
[52] U.S. Cl. .......................................... 99/340; 99/355;
99/417; 99/418; 99/446; 99/448; 99/482;
126/369; 126/381; 215/234; 219/401; 219/438;
220/228; 277/135
[58] Field of Search .......... 99/339, 340, 341, 345–347,
99/352, 355, 357, 403, 410, 415, 416–418, 422,
447–449, 467, 470, 472, 482; 220/205, 217, 228,
428, 912; 215/234; 277/135, 13, 14 R, 14 V;
126/381, 373, 376, 377, 389, 25 R, 29, 30;
219/438, 440, 441, 401

[56]        References Cited
U.S. PATENT DOCUMENTS

|           |         |            |         |
|-----------|---------|------------|---------|
| 84,020    | 11/1868 | Thal et al. | 220/205 |
| 643,230   | 2/1900  | Moller     | 215/234 |
| 831,673   | 9/1906  | Lynn       | 220/228 |
| 1,172,836 | 2/1916  | Roser      | 277/135 |
| 1,187,219 | 6/1916  | With       | 220/228 |
| 1,754,091 | 4/1930  | Friedman   | 220/228 |
| 2,622,591 | 12/1952 | Bramberry  | 126/381 |
| 3,937,210 | 2/1976  | Kachaylo   | 126/381 |
| 4,148,250 | 4/1979  | Miki et al. | 99/415 X |
| 4,702,160 | 10/1987 | Manganese  | 126/369 X |
| 4,759,342 | 7/1988  | Lee et al. | 99/347  |
| 4,762,058 | 8/1988  | Masel .    |         |

FOREIGN PATENT DOCUMENTS

| 0375825 | 7/1990 | European Pat. Off. ............ 99/416 |
| 9103972 | 4/1991 | Israel . |

Primary Examiner—Timothy F. Simone

[57]           ABSTRACT

A cooking utensil includes a container having a peripheral wall at its upper end outwardly circumscribing its open top and defining therewith an annular reservoir for receiving a quantity of water. A lid overlies the container open top and includes a depending skirt dimensioned to become partially immersed in the reservoir water and to divide the upper part of the reservoir into an inner section, and an outer section communicating with the inner section via the bottoms of the two sections The open top of the container is formed with a triangular slot permitting a small quantity of liquid to be automatically drawn from the reservoir into the interior of the container upon cooling of the container.

20 Claims, 3 Drawing Sheets

COOKING UTENSIL

FIELD AND BACKGROUND OF THE INVENTION

The present invention relates to a cooking utensil for cooking various articles of food. The invention is particularly useful with respect to the cooking utensil described in WO 9103972 published Apr. 14, 1991, and is therefore described below with respect to that type of cooking utensil.

WO 9103972 discloses a cooking utensil comprising a container for receiving articles of food to be cooked, and a lid attachable to the container and defining therewith an annular water reservoir surrounding the open top of the container for receiving a liquid. The liquid seals the interior of the container against the entry of air from the atmosphere and also filter out any smoke or other particles produced in the container during the cooking. Since the liquid seal prevents the entry of air into the container, the food articles to be cooked, as well as additive material (e.g., wood chips, or other substances, to provide color flavor or aroma) introduced at the bottom of the container, may be heated to a very high temperature without ignition. The high temperature within the container causes the food articles to be cooked in a relative short time. It also causes the volatile ingredients of the additive material to be readily evaporated, thereby adding color, flavor and/or aroma to the food product.

However, in the cooking utensil described in that document the lid must be locked to the container, and the interior of the container should be substantially cooled and depressurized to near atmospheric pressure, before the lid is removed; otherwise, removal of the lid while the interior of the container is still very hot, and under a relatively high vacuum, may draw a large quantity of the liquid from the annular reservoir into the interior of the container, instantly vaporizing the liquid and producing a high pressure which could be dangerous. For this reason, the cooking utensil described in that document includes a locking device for locking the lid to the container, and one version also includes a valve to permit only a small quantity of the water to be introduced into the reservoir during the cooling process

OBJECT AND BRIEF SUMMARY OF THE INVENTION

An object of the present invention is to provide a cooking utensil particularly of the foregoing type but having advantages over that described in WO 9103972, as will be more particularly set forth below.

According to the present invention, there is provided a cooking utensil, comprising: a container for receiving articles of food to be cooked, the container having a closed bottom, an open top, and a peripheral wall at its upper end outwardly circumscribing its open top and defining therewith an annular reservoir for receiving a quantity of water; and a lid overlying the open top of the container. The lid includes a depending skirt dimensioned to become partially immersed in the reservoir water and thereby to divide the upper part of the reservoir into an inner section, and an outer section communicating with the inner section via the portions of the two sections below the depending skirt. The container is formed with a slot extending a short distance inwardly of its open top such that the outer end of the slot is at the container open top and the inner end of the slot is spaced a short distance inwardly of the container open top. The inner end of the slot is of narrow width to permit only a small quantity of liquid to be automatically drawn from the reservoir into the container upon a decrease in the pressure within the container during its cooling, thereby to gradually cool and depressurize the interior of the container.

According to further features in the described preferred embodiment, the slot is of generally triangular configuration, being relatively wide at its outer end and relatively narrow at its inner end. In addition, the lid includes an outer rim seatable on the peripheral wall of the container. The lid is of sufficient weight to retain it seated on the peripheral wall independently of any means for locking the lid to the container. In addition, the peripheral wall is formed with a window for viewing the level of the water in the outer reservoir section.

As will be described more particularly below, a cooking utensil constructed in accordance with the foregoing features does not require a control valve to permit only a small quantity of the water to be drawn into the container during its cooling, as in WO 9103972, since the slot at the upper end of the container automatically performs this function. Further, the lid need not be locked to the container. In addition, the provision of the window permits the user to observe the level of the water in the outer reservoir section, and thereby to be informed of the state of the cooking process without opening the lid.

Further features and advantages of the invention will be apparent from the description below.

BRIEF DESCRIPTION OF THE DRAWINGS

The invention is herein described, by way of example only, with reference to the accompanying drawings, wherein.

DESCRIPTION OF A PREFERRED EMBODIMENT

Figure 1:
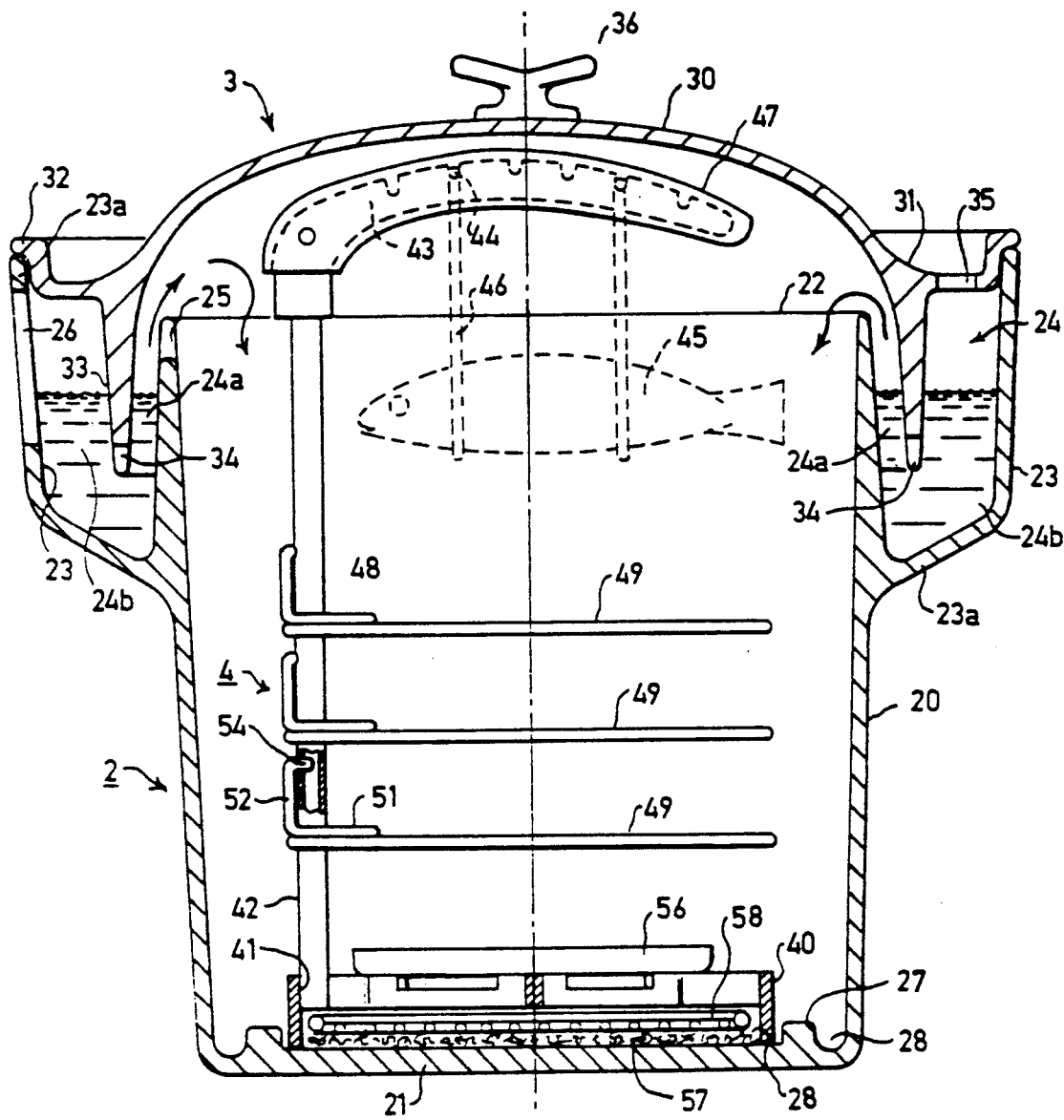
FIG. 1 is a longitudinal sectional view illustrating one form of cooking utensil constructed in accordance with the present invention.
Figure 2:
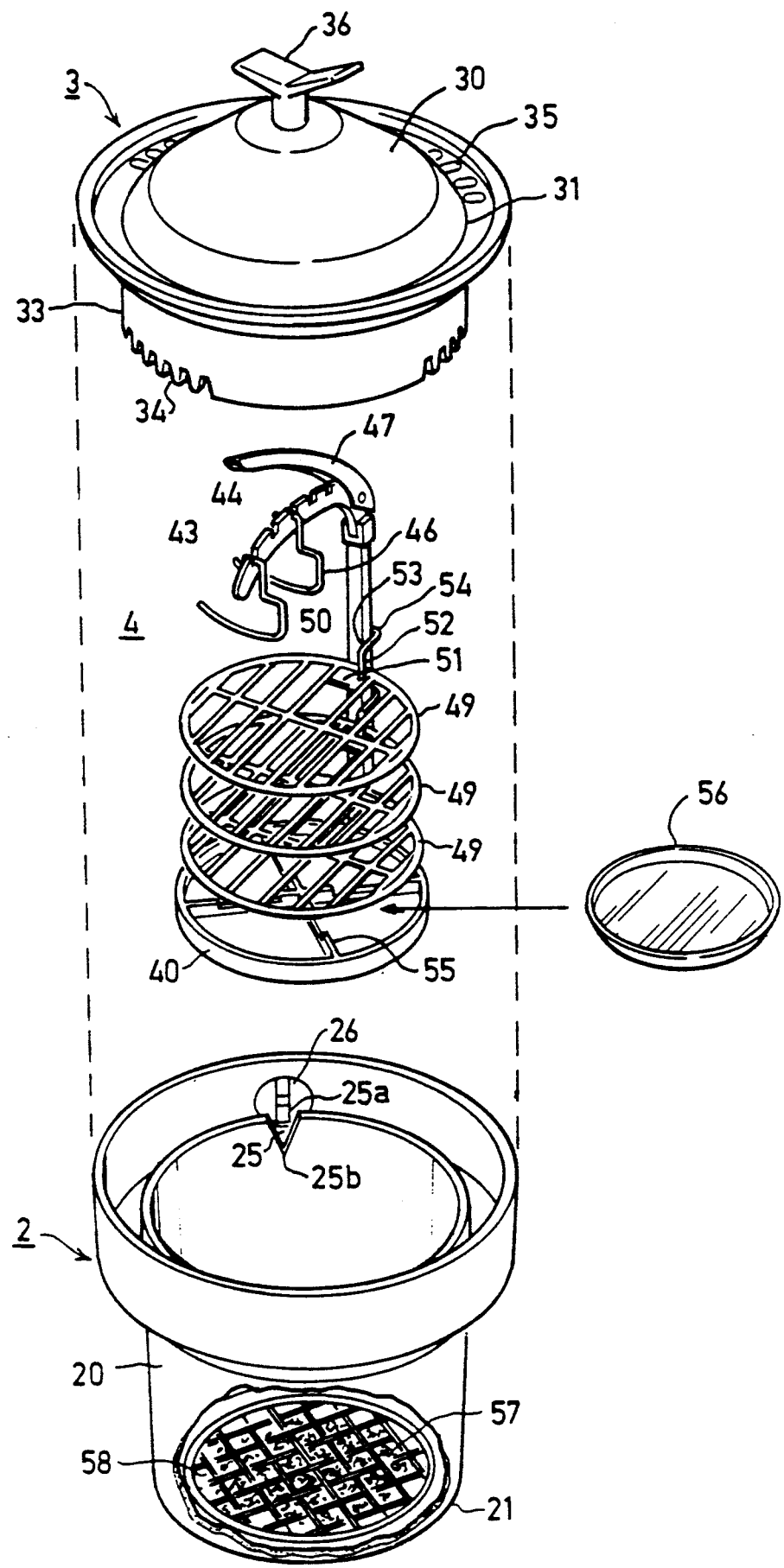
FIG. 2 is an exploded three-dimensional view of the main components of the cooking utensil of FIG. 1.

The cooking utensil illustrated in FIGS. 1 and 2 of the drawings includes three main components: a container 2 for receiving the articles of food to be cooked; a lid 3 closing the upper end of the container; and a supporting device 4 for supporting the articles to be cooked within the container.

Container 2 includes a substantially cylindrical wall 20 closed at its lower end by a bottom wall 21 and open at its upper end 22. A peripheral wall 23 outwardly circumscribes the upper end 22 of container wall 20 and defines therewith an annular reservoir 24 for receiving a quantity of water. The lower end of reservoir wall 23 is joined to container wall 20 by a conical juncture wall 23a, which also defines the bottom of the water reservoir 24. Reservoir wall 23 is formed with a window 26 to permit viewing the condition of reservoir 24.

The upper end of reservoir wall 23 projects above the open end 22 of the container wall 20, as shown at 23a in FIG. 1. The open end 22 of container wall 20 is formed with an axially-extending slot 25. As shown in FIG. 2, slot 25 is of generally triangular configuration, being wide at its outer end 25a and gradually decreasing in width to its narrow inner end 25b.

Bottom wall 21 of the container 2 is formed with an annular rib 27 to define a central circular recess 28 for receiving the food article supporting device 4, and for spacing it from the inner face of the container side wall 20 by an annular space 28 for collecting any drippings along the wall.

Lid 3 includes a main section 30 of generally convex configuration, and an annular channel portion 31 of generally concave configuration terminating at its outer periphery in an annular rim 32 seatable on the reservoir wall 23 of the container 2. Lid 3 is further formed with a depending skirt 33 which is dimensioned to become partially immersed in the water within reservoir 24, as shown in FIG. 1. Skirt 33 thereby divides the upper part of the reservoir into an inner section 24a and an outer section 24b communicating with the inner section via the portions of the two sections below the skirt. The lower edge of skirt 33 is formed with a plurality of axially-extending slots 34. In addition, lid 3 is formed with a plurality of openings 35 through the channel section 31 overlying the outer reservoir section 24b, and with a handle 36 centrally of the lid for grasping it.

As will be described more particularly below, when lid 3 is received over container 20, and reservoir 24 is filled with water, the liquid within the reservoir acts as a seal to prevent air from the outside entering the container 20. This enables the container to be heated to a relatively high temperature without igniting the contents of the container. In addition, the water in reservoir 24 serves as a filter for removing, from the hot gasses passed to the atmosphere, any smoke or other particles produced in the container during the cooking process.

Openings 35 serve two functions: First, they provide a means, cooperable with channel section 31, for filling the reservoir 24 with water without removing the lid 3 from the top of the container 2; in addition, they serve as venting openings for venting to the atmosphere the water within reservoir 24 during the cooking process.

The article supporting device 4 includes a base ring 40 formed at one end with a socket 41 for receiving the lower end of a vertical post 42. The upper end of post 42 fixedly mounts a horizontal arm 43 formed on its upper face with a plurality of notches 44. These notches are used for suspending articles of food, as indicated by a fish 45, by means of hangers 46. A handle 47 of low heat-transfer material (e.g., plastic) is also carried at the upper end of vertical post 42. Handle 47 is pivotally mounted either to an operative position enclosing arm 43 during the use of the cooking utensil, or to an extended position shown in FIG. 2 to facilitate insertion and removal of the article supporting device 4 with respect to the container 2.

Vertical post 42 is formed along its length with a plurality of vertically-spaced notches 48 for supporting a plurality of grills 49 at different vertical levels. Each grill 49 is supported from one of the notches 48 by means of a bracket 50 having a flat strip 51 secured to the grill, a vertical leg 52 secured at its lower end to the flat strip 51, and a horizontal leg 53 extending from the upper end of vertical leg 52 and formed with an end hook 54 receivable within one of the notches 48. Thus, the juncture of strip 51 with vertical leg 52 serves as a fulcrum, with the weight of the grill 49, and the food article carried thereon, tending to pivot the end hook 54 into the respective notch 48.

Base ring 40 at the lower end of supporting device 4 includes two diametrical rods 55 for supporting a drip pan 56. Pan 56 catches the drippings from the food articles supported from the horizontal arm 43 at the upper end of the vertical post 41, or from the horizontal grills 49 vertically spaced along the length of the vertical post 41.

The circular recess 28 in the container bottom wall 21 is adapted to receive any selected additive material, shown at 57, such as wood chips, pieces of fruit (e.g., dried apple pieces), pieces of vegetables (e.g., dried onions), etc., according to the special flavor, aroma and/or color desired to be imparted to the cooked food article. Another grid 58 is applied over the recess to receive the drip pan 56.

The cooking utensil illustrated in FIGS. 1 and 2 may be used in the following manner:

First, the lid 3 and the article supporting device 4 are both removed from the container 2, to permit the introduction of the desired additive material 57. With the handle 47 of the article supporting device 4 pivotted to its extended position as shown in FIG. 2, the article supporting device is then inserted into the container with the base ring 40 applied over the additive material, and the vertical post 41 extending vertically within the container. One or more grills 49 are first applied at the appropriate locations of post 41 for receiving the food articles to be cooked. Such food articles, e.g., fish 45, to be cooked may also be suspended from hangers 46 received in the notches 44 in the horizontal arm 43 at the upper end of the vertical post 41. Grill 58 is applied over the additive material 57, and drip pan 56 is applied over grill 58 to catch any drippings.

Lid 3 is then applied over the top of the container with the outer rim 32 of the lid seated on the upper end 23a of the reservoir wall 23 of the water reservoir 24 circumscribing the upper end of the container.

Water may then be introduced into channel 31 of the lid 3 to flow via its openings 35 into the water reservoir 24, until the water assumes the appropriate level wherein it partially immerses the depending skirt 33 of lid 3. The level of the water within reservoir 24 may be viewed via window 26. When sufficient water is thus introduced to partially immerse skirt 33 as shown in FIG. 1, it will be seen that the skirt divides the reservoir 24 into an inner section 24a and an outer section 24b of larger cross-sectional area than the inner section. As described earlier, the water within reservoir 24 serves as a seal to prevent air from entering the container during the cooking process, and also as a filter for filtering out smoke or any other particles that may be produced within the container during the cooking process.

Heat may then be applied to the bottom wall 21 of the container in any suitable manner, e.g., gas heat, electric heat, etc. Since no air can enter the container during cooking, the container may be heated to a very high temperature without igniting the additive material 57 or the food articles within the container. Since the additive material 57 is at the hottest part of the container, the volatile components in this material will be evaporated and will condense on the food articles spaced above the container bottom and therefore at a lower temperature. The additive material condensing on the food articles thus imparts to them the desired flavor, aroma, or color (e.g., an attractive brown color).

During the cooking process, the increase in temperature within the container produces an increase in pressure. Since the pressure within the inner reservoir section 24a is the same as within the container 2, whereas the outer reservoir section 24b is vented to the atmosphere via openings 35, the water level within the inner reservoir section 24a will drop, while that in the outer reservoir section 24b will rise. If the water level within the inner reservoir section 24a drops to the slots 34, air from the interior of the container will pass through the slots 34 and will be seen as bubbles rising in the water of the outer reservoir section 24b. The condition of the water within the outer reservoir section 24b is viewable via window 26, so that when bubbling is seen in the outer reservoir section 24b, it is known that the food articles within the container are being cooked at a high temperature. The heating may be stopped at a predetermined time thereafter.

When the heating is terminated, the temperature within the container is still very high so that cooking of the food article continues. As the container cools and the temperature drops, the pressure within the container also drops. This causes the water level within the inner reservoir section 24b to rise, and that in the outer reservoir section 24b to drop. When the water level within the inner reservoir section 24a rises to the bottom 25b of the triangular slot 25, a small quantity of water is automatically drawn into the interior of the container and is immediately evaporated, thereby further cooling the container interior and also bringing its pressure closer to ambient.

It is to be particularly noted that because of the triangular shape of slot 25, only a small quantity of water is drawn into the interior of the container. This causes the pressure to increase sufficiently to bring the level of the water within the outer reservoir section 24a below the bottom 25b of the triangular slot 25 which terminates the entry of water into the container. However, continued cooling of the interior of the container will again reduce the pressure within it to again draw another small quantity of water via the bottom 25b of the triangular slot 25, to further cool the container and to increase its pressure. This may continue several times until the interior of the container is depressurized to substantially ambient, whereupon the lid 3 may be removed.

If the lid 3 is removed before the interior of the container has been completely depressurized, water from the reservoir inner section 24a will be instantly drawn into the container via the triangular slot 25 to cool it and to break the vacuum.

The cooking utensil illustrated in FIGS. 1 and 2 thus provides a gradual breaking of the vacuum during the cooling of the container interior, and does not require either a locking device for locking the rim 3 to the container, or a valve for controlling the inletting of the water into the container interior The user can view the condition of the water within the outer reservoir section 24b to be thereby continuously informed as to the status of the cooking. If the user, however, removes the lid 3 prematurely, the initial opening movements of the lid 3 will cause only a small quantity of water from the inner reservoir section 24a to be drawn into the container interior via the triangular opening 25, thereby cooling and depressurizing the container interior.

Figure 3:
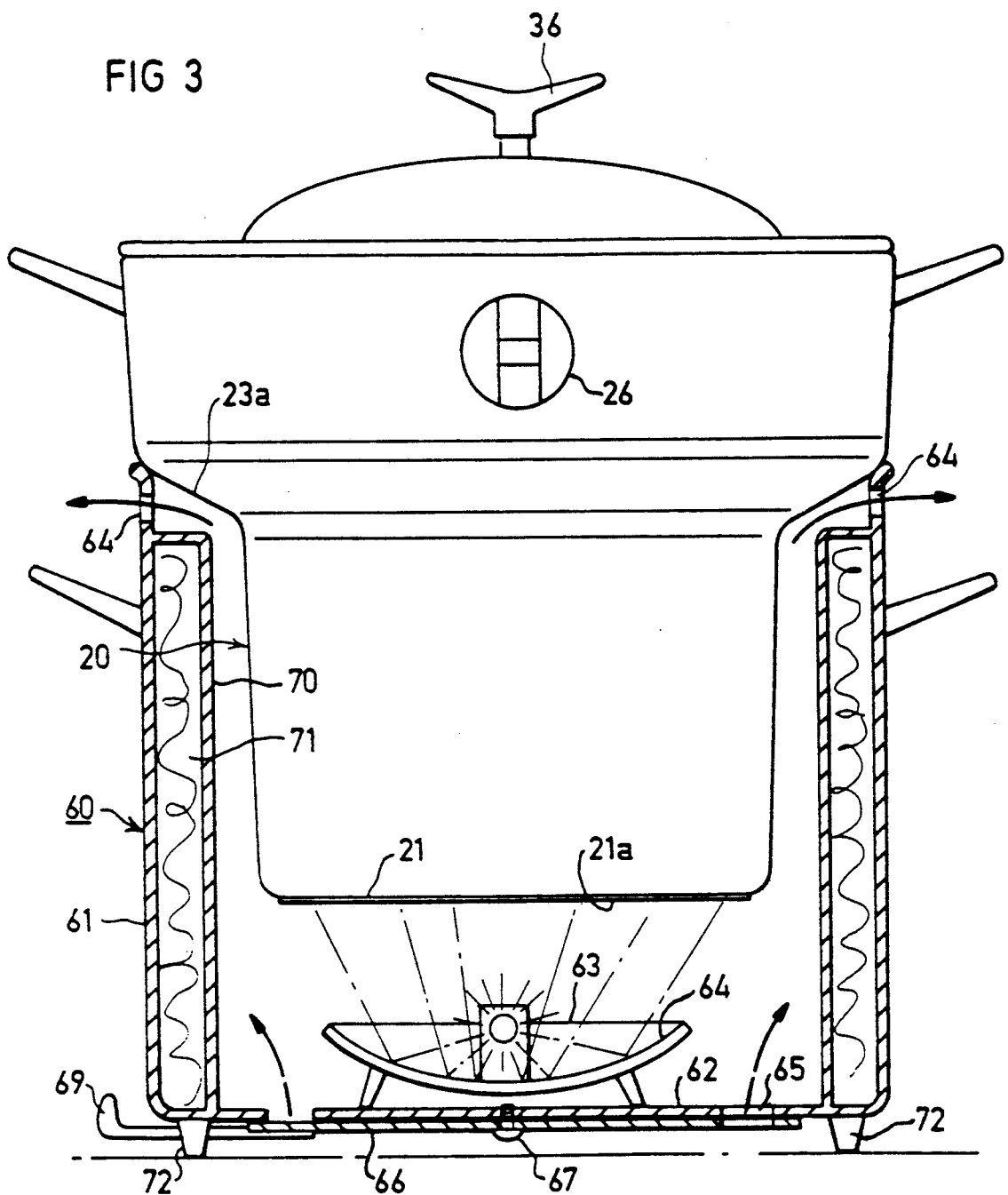
FIG. 3 is a longitudinal sectional view illustrating a cooking utensil as in FIGS. 1 and 2 together with a heating device for heating the cooking utensil.
Figure 4:
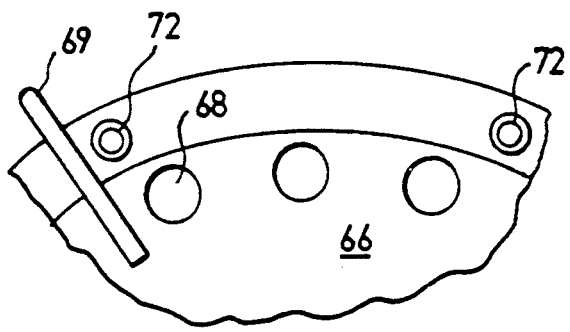
FIG. 4 is a fragmentary view illustrating a portion of the bottom wall of the heating device of FIG. 3.

FIG. 3 illustrates the cooking utensil of FIGS. 1 and 2 included within a heating device, generally designated 60 for heating the container 2. Heating device 60 includes a cylindrical housing 61 open at its top for receiving the conical wall 23a of the container 20 and for spacing the bottom wall 21 of the container above the bottom wall 62 of the heating device. A halogen lamp 63 and a reflector 64 are mounted on the bottom wall 62 of the heating device 60 to heat the bottom wall 21 of the container 2. The outer surface of the bottom wall may be blackened for this purpose as shown at 21a.

The upper end of the heating device housing 61 is formed with a plurality of openings 64 to vent its interior to the atmosphere and thereby to facilitate the dissipation of the heat. The bottom wall 62 of the heating device is also formed with a plurality of openings 65. These openings, however, may be selectively closed by a plate 66 rotatably mounted to the bottom wall 62 at its center 67 and formed with a plurality of holes 68 which are alignable with openings 65 in the bottom wall 62. Plate 66 may be rotated by handle 69 either to a first position wherein the plate covers openings 65 in the bottom wall 62 of the heating device 60 during a cooking operation, to thereby preserve the heat within the heating device; or it may be rotated to a second position wherein the holes 68 in the plate 66 are aligned with openings 65 in the bottom wall 62 of the heating device to facilitate cooling of the interior of the heating device after the cooking has been terminated.

The cylindrical housing 61 of the heating device 60 is formed with an inner wall 70, and the space between it and wall 61 is filled with insulation 71. This maintains the outer surface of housing 61 relatively cool and preserves the heat within it during a cooking operation. Housing 61 further includes a plurality of feet 72 for supporting it above a horizontal supporting surface.

While the invention has been described with respect to one preferred embodiment, it will be appreciated that this is set forth merely for purposes of example, and that many other variations, modifications and applications of the invention may be made.

What is claimed is:

1. A cooking utensil, comprising:
   a container for receiving articles of food to be cooked, said container having a closed bottom, an open top, and a peripheral wall at its upper end outwardly circumscribing its open top and defining therewith an annular reservoir for receiving a quantity of water;
   and a lid overlying said open top of the container and including a depending skirt dimensioned to become partially immersed in the reservoir water and thereby to divide the upper part of the reservoir into an inner section and an outer section communicating with said inner section via the portions of the two sections below said depending skirt;
   said container being formed with a slot extending a short distance inwardly of the container open top such that the outer end of the slot is at the container open top and the inner end of the slot is spaced a short distance inwardly of the container open top, said inner end of the slot being of a narrow width to permit only a small quantity of liquid in said reservoir to be automatically drawn into the container, upon a decrease in pressure therein during its cooling, thereby to gradually cool and depressurize the interior of the container.

2. The cooking utensil according to claim 1, wherein said slot is of generally triangular configuration, being relatively wide at its outer end and relatively narrow at its inner end.

3. The cooking utensil according to claim 1, wherein said lid includes an outer rim seatable on said peripheral wall of the container.

4. The cooking utensil according to claim 3, wherein said lid is of sufficient weight to retain it seated on said peripheral wall independently of any means for locking the lid to the container.

5. The cooking utensil according to claim 1, wherein said peripheral wall is formed with a window for viewing the level of the water in said outer reservoir section.

6. The cooking utensil according to claim 1, wherein said lid is formed with venting openings overlying said outer reservoir section.

7. The cooking utensil according to claim 6, wherein said venting openings are formed through an annular channel in said lid located to enable said channel to serve as a means for filling the reservoir with a liquid via said venting openings without removing the lid.

8. The cooking utensil according to claim 1, wherein said outer section of the reservoir is of larger cross-sectional area than said inner section of the reservoir.

9. The cooking utensil according to claim 8, wherein the lower edge of said skirt is formed with a plurality of slots.

10. The cooking utensil according to claim 1, further including a supporting member within the container for supporting food articles therein spaced from the bottom of the container.

11. The cooking utensil according to claim 1, further including a compartment at the bottom of said container for receiving an additive material having a volatile component.

12. The cooking utensil according to claim 1, further including a heating device comprising a holder open at its top and closed at its bottom by a bottom wall, and an electrical heater supported on said bottom wall; said holder being dimensioned to support the container in the open top of the holder with the bottom of the container spaced above said heater.

13. The cooking utensil according to claim 12, wherein said holder is formed with venting openings adjacent its top, and further venting openings through its bottom wall, said holder further including manual closure means for manually closing or opening said openings in the holder bottom wall.

14. The cooking utensil according to claim 12, wherein said electrical heater includes a halogen lamp.

15. A cooking utensil, comprising:
a container for receiving articles of food to be cooked, said container having a closed bottom, an open top, and a peripheral wall at its upper end outwardly circumscribing its open top and defining therewith an annular reservoir for receiving a quantity of water;
and a lid including an outer rim seatable on said peripheral wall to cover said open top of the container and said reservoir;
said lid further including a depending skirt dimensioned to become partially immersed in the reservoir water and thereby to divide the upper part of the reservoir into an inner section, and an outer section of larger cross-sectional area than said inner section and communicating therewith via the portions of the two sections below said depending skirt;
said container being formed with a triangular slot extending a short distance inwardly of the container open top such that the outer end of the slot is wide and the inner end of the slot is narrow to permit only a small quantity of liquid in said reservoir to be automatically drawn into the container, upon a decrease in pressure therein during its cooling, thereby to gradually cool and depressurize the interior of the container;
said lid being of sufficient weight to retain it seated on said peripheral rim independently of any means for locking the lid to the container.

16. The cooking utensil according to claim 15, wherein said lid is further formed with an annular channel overlying said outer section of the reservoir and a plurality of venting openings formed through said annular channel and communicating with said outer section of the reservoir.

17. The cooking utensil according to claim 15, wherein said peripheral wall is formed with a window for viewing the level of the water in said outer reservoir section.

18. The cooking utensil according to claim 15, further including a supporting member within the container for supporting a food article therein spaced from the bottom of the container, and a compartment at the bottom of said container for receiving an additive material having a volatile component.

19. The cooking utensil according to claim 15, further including a heating device comprising a holder having an electrical heater at its bottom and an open top for receiving the container and for spacing its bottom wall above the electrical heater.

20. The cooking utensil according to claim 19, wherein said electrical heater includes a halogen lamp, and the bottom of said container is blackened to absorb the heat therefrom.

* * * * *